United States Patent
Yoshida (10) Patent No.: US 8,017,267 B2
(45) Date of Patent: Sep. 13, 2011

(54) METHOD FOR MANUFACTURING SEALED BATTERY AND SEALED BATTERY MANUFACTURED THEREBY

(75) Inventor: Satoshi Yoshida, Naruto (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 296 days.

(21) Appl. No.: 11/607,891

(22) Filed: Dec. 4, 2006

(65) Prior Publication Data

US 2007/0128514 A1  Jun. 7, 2007

(30) Foreign Application Priority Data

Dec. 6, 2005 (JP) ................... 2005-351635

(51) Int. Cl.
*H01M 2/08* (2006.01)
(52) U.S. Cl. ........................ 429/185; 429/163
(58) Field of Classification Search .................. 429/185, 429/163, 171, 175, 174, 176, 177; 29/623.1, 29/623.2, 623.4
See application file for complete search history.

(56) References Cited

U.S. PATENT DOCUMENTS

| | | | |
|---|---|---|---|
| 6,264,708 B1 * | 7/2001 | Haraguchi et al. | 29/623.2 |
| 6,571,816 B2 * | 6/2003 | Morishita et al. | 137/68.27 |
| 2003/0157404 A1 * | 8/2003 | Inoue et al. | 429/175 |
| 2005/0118501 A1 | 6/2005 | Hashimoto et al. | |

FOREIGN PATENT DOCUMENTS

| | | |
|---|---|---|
| JP | 8-77983 A | 3/1996 |
| JP | 09-007557 A | 1/1997 |
| JP | 9-92248 A | 4/1997 |
| JP | 2005-183360 A | 7/2005 |

OTHER PUBLICATIONS

Chinese Office Action dated Apr. 10, 2009 issued in corresponding Chinese patent Application No. 200610163718.8.

* cited by examiner

*Primary Examiner* — Stephen J. Kalafut
*Assistant Examiner* — Monique Wills
(74) *Attorney, Agent, or Firm* — Westerman, Hattori, Daniels & Adrian, LLP (57) ABSTRACT

A method for manufacturing a sealed battery according to one embodiment of this invention includes a first step of using an outer can 15 having an opening, and a sealing plate 16 having a flange provided with a groove 22 around or on a part of a fitting face of the sealing plate 16 with the outer can 15, and inserting the sealing plate 16 into the opening of the outer can 15 so that a top face of the outer can 15 is approximately flush with a top face of the flange of the sealing plate 16, and a second step of welding together the outer can 15 and the sealing plate 16 by radiating a high energy ray to the fitting portion therebetween. The invention thus makes it possible to provide a method for manufacturing a sealed battery in which a weld formed by welding a sealing plate fitted into an opening of an outer can of a battery with a laser or other high energy rays has a large breaking strength, and a sealed battery manufactured thereby.

10 Claims, 7 Drawing Sheets

Fif. 2B

METHOD FOR MANUFACTURING SEALED BATTERY AND SEALED BATTERY MANUFACTURED THEREBY

FIELD OF THE INVENTION

The present invention relates to a method for manufacturing a sealed battery and a sealed battery manufactured thereby. The invention particularly relates to a method for manufacturing a sealed battery in which a weld formed by welding a sealing plate fitted into an opening of an outer can of a battery with a laser or other high energy rays has a large breaking strength, and a sealed battery manufactured thereby.

BACKGROUND OF THE INVENTION

As use of portable electronic apparatuses rapidly spreads, the specifications required for a battery used with these apparatuses have become increasingly stringent over the years. In particular, such a battery has been required to be small and thin and have a large capacity, an excellent cycle characteristic, and stable performance. In the secondary battery field, attention has been paid to nickel hydrogen batteries and lithium non-aqueous electrolyte batteries for their higher energy density than other kinds of batteries. The share of the both types in the secondary battery market is substantially growing.

Many apparatuses using these types of secondary batteries have a prismatic (flat box-shaped) space for housing a battery. Therefore, sealed secondary batteries that have a power generating element housed and sealed in a prismatic outer can have often been used for such apparatuses. An example of such prismatic sealed secondary batteries will be described with reference to one of the accompanying drawings.

Figure 5:
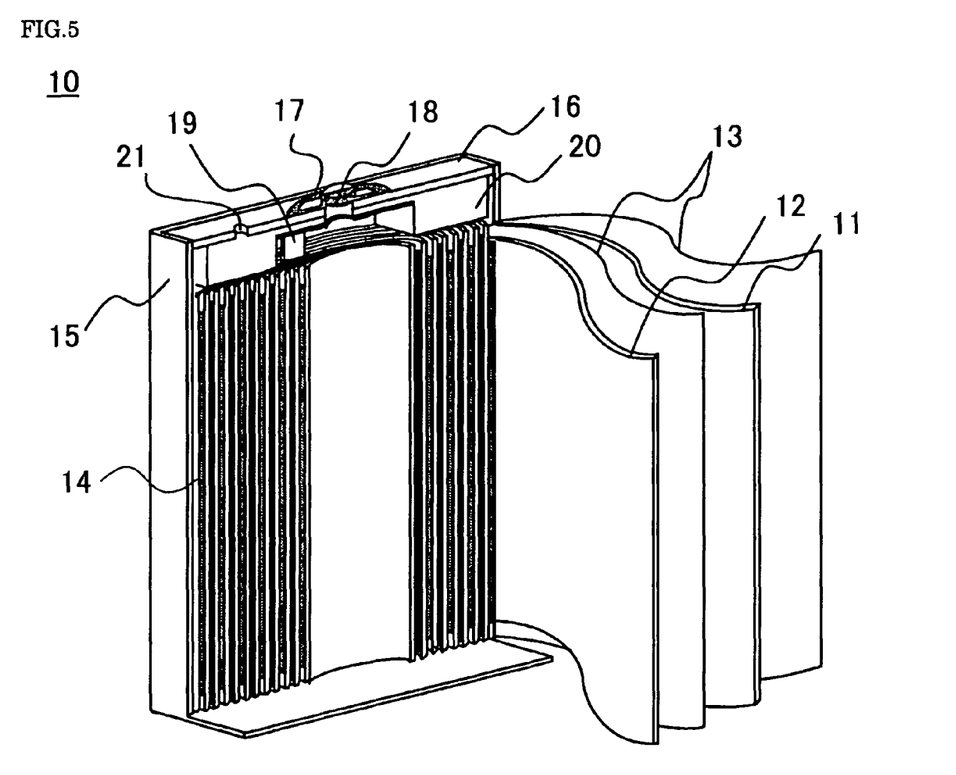
FIG. 5 is a perspective view showing a cross section in a vertical direction of a related-art lithium non-aqueous electrolyte secondary battery which is a prismatic sealed secondary battery.

FIG. 5 is a perspective view showing a cross section in a vertical direction of a related-art lithium non-aqueous electrolyte secondary battery which is a prismatic sealed secondary battery. In this sealed secondary battery 10, a flat scrolled electrode 14 in which a positive plate 12 and a negative plate 11 are wound with a separator 13 therebetween is housed in a prismatic battery outer can 15. The outer can 15 is sealed by a sealing plate 16.

The positive plate 12 of the flat scrolled electrode 14 is wound so as to be positioned at the outmost edge of the electrode and thus exposed. The positive plate 12, positioned at the outmost edge and exposed, comes into contact with and is electrically connected to an inner face of the prismatic battery outer can 15, which also serves as a positive terminal. The negative plate 11 is electrically connected to a negative terminal 18, mounted at the center of the sealing plate 16 with an insulator 17 therebetween, via a current collector 19.

Since the prismatic battery outer can 15 is electrically connected to the positive plate 12, it is necessary to prevent a short-circuit from occurring between the negative plate 11 and the prismatic outer can 15. For that purpose, an insulation spacer 20 is inserted between an upper end of the prismatic scrolled electrode 14 and the sealing plate 16 to establish insulation between the negative plate 11 and the prismatic outer can 15.

The prismatic non-aqueous electrolyte secondary battery 10 is manufactured by inserting the flat scrolled electrode 14 inside the prismatic battery outer can 15, then laser welding the sealing plate 16 to the opening of the battery outer can 15, and injecting non-aqueous electrolyte from an electrolyte injection hole 21 to seal the electrolyte hole 21. This method for fixing the sealing plate 16 to the prismatic outer can 15 by laser welding as described above has widely been used for its advantageous effect of tightly sealing the opening of the prismatic outer can 15.

Figure 6:
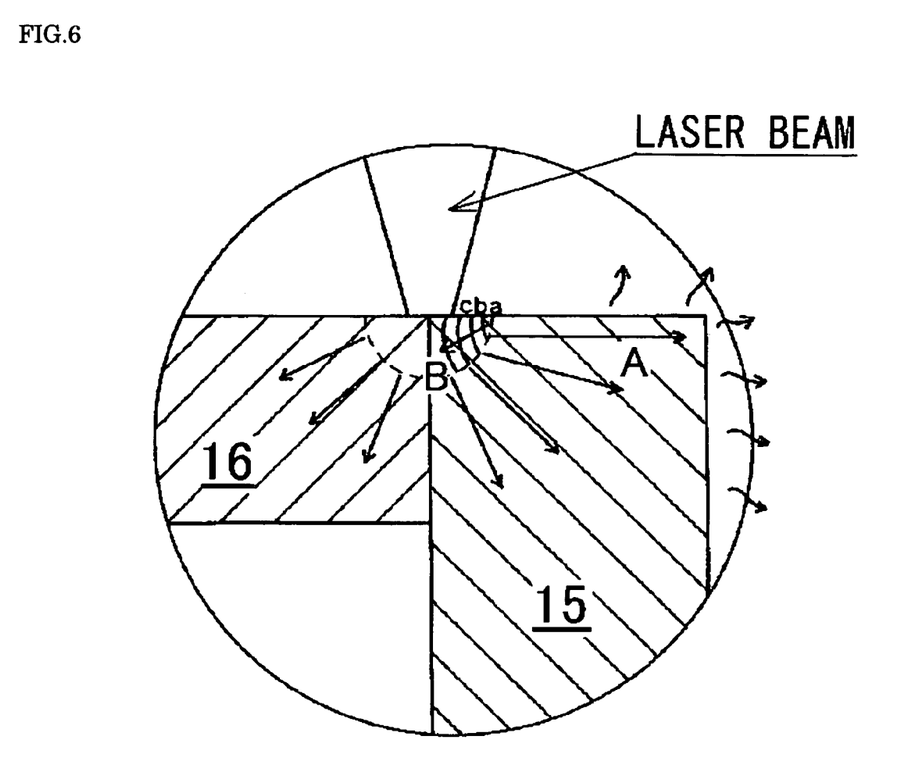
FIG. 6 is a sectional view showing a related-art method for laser welding a sealing plate to an outer can of a prismatic battery.

The method for manufacturing the sealed battery by laser welding the sealing plate to the prismatic outer can as described above has an excellent advantage of allowing a reduction in weight of the prismatic battery, in particular, if aluminum or aluminum alloy having excellent thermal conductivity is used as the material for the prismatic outer can and the sealing plate. However, a crack tends to occur in a weld between the sealing plate and the prismatic outer can, which may significantly reduce the yield of the product. The reason for the tendency of a crack to occur in the weld between the sealing plate and the prismatic outer can will be described with reference to FIG. 6. FIG. 6 is a sectional view showing a related-art method for laser welding a sealing plate to an outer can of a prismatic battery as disclosed in JP-8-77983-A (claims, paragraphs [0018] to [0022], FIGS. 2 to 4). Elements of a prismatic sealed battery as shown in FIG. 6 are given the same reference numerals as those of the abovementioned prismatic sealed battery.

The sealing plate 16 is set inside the outer can 15 of the prismatic battery and then a laser beam is radiated on the boundary therebetween. Consequently, a metal material such as aluminum in areas indicated by the chain lines is heated up to about 1,000° C., melted and welded. When aluminum is used as the material for the prismatic outer can 15 and the sealing plate 16, the depth of the melted portion indicated by the chain lines is about 0.2 to 0.3 mm. In the heated and melted metal, heat is conducted in the directions indicated by the arrows, whereby the metal is cooled and hardened. While the heat conducted in the arrow directions is radiated from surfaces of the prismatic outer can 15 and the sealing plate 16, the heat is more efficiently radiated from the corners of the prismatic outer can 15, reducing the temperature. In general, heat is efficiently conducted to a lower temperature portion, so the heat in the melted portion is more efficiently conducted in a direction indicated by the arrow A. Consequently, the melted portion is cooled from an outer part thereof and hardened in the order of a, b, and c regions. In other words, the hardened region expands from outside to inside as indicated by the arrow B.

The volume of metals shrinks when cooled, thus hardening the metal. Therefore, the melted portion shrinks in volume when its outer part is hardened, and thus a part of the interior of the melted portion, which is still being melted, moves to outside. Then the interior of the melted portion shrinks in volume when hardened. Further, the part of the interior of the melted portion that has moved outward causes tensile stress. This causes a crack in a boundary between the prismatic outer can 15 and the sealing plate 16, which has a low tension strength. Such a crack is more likely to occur in the corners of the prismatic outer can 15 due to efficient heat radiation from the surfaces of the corners. This kind of crack occurs not only when the prismatic outer can and the sealing plate are laser welded but also when a circular outer can and a sealing plate are laser welded or when an electron beam is used for welding instead of a laser beam.

Figure 7:
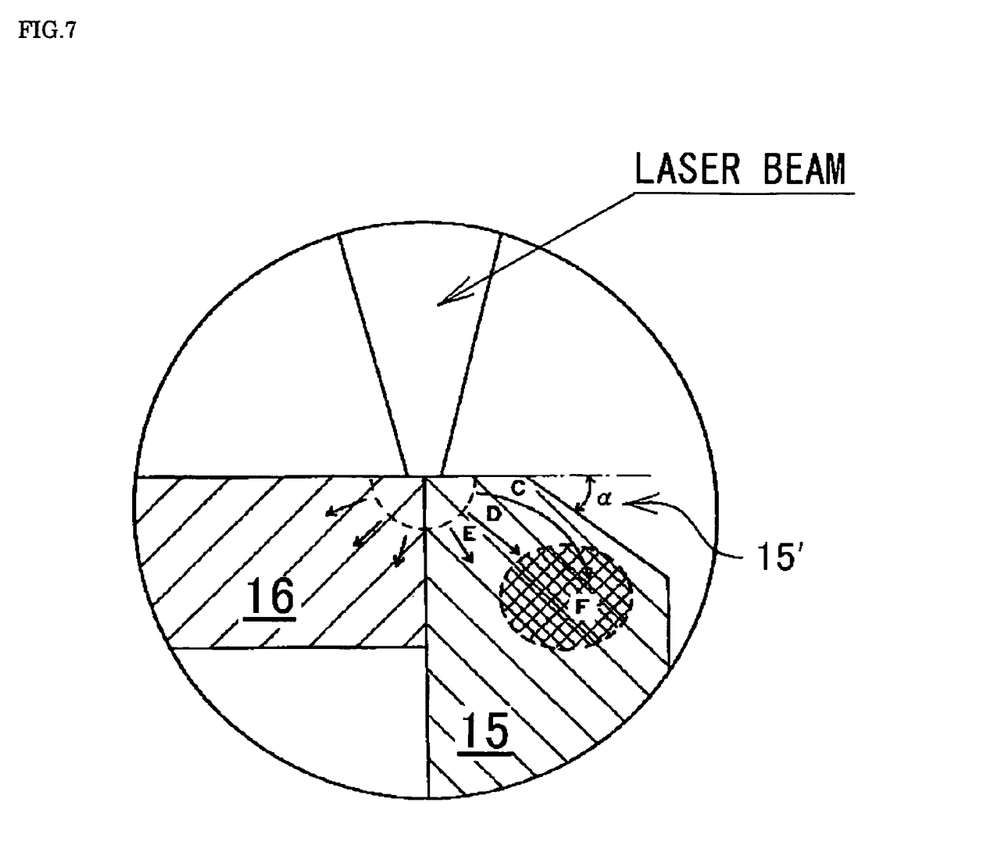
FIG. 7 is a sectional view showing a related-art method for laser welding a sealing plate provided with a heat radiating portion to an outer can of a prismatic battery.

In the invention of the method for manufacturing a prismatic sealed battery as disclosed in JP-8-77983-A, an edge of the prismatic outer can 15 is cut off by a predetermined angle α to form a heat radiation eliminating portion 15', as shown in FIG. 7. This is to reduce the heat radiation efficiency at the edge of the prismatic outer can 15 and thus reduce the likelihood of occurrence of a crack between the prismatic outer can 15 and the sealing plate 16. In this case, radiation of heat in the melted portion is directed downward as indicated by the arrow C because the heat conductivity of the prismatic outer can 15 is much larger than that of the air. The heat conducted downward as indicated by the arrow C raises the temperature of a region F indicated by crosshatching, and thus heat radiation in directions indicated by the arrows D and E is reduced. This reduces the likelihood that, in the prismatic outer can 15 and the sealing plate 16 as shown in FIG. 6, the melted portion is cooled and hardened from an outer part thereof, and causes the melted portion to be cooled slowly. Therefore, the likelihood that a crack occurs in the boundary between the prismatic outer can 15 and the sealing plate 16 becomes extremely low.

In the prismatic sealed battery as disclosed in JP-8-77983-A, the edge of the prismatic outer can 15 is cut off by the predetermined angle α to form the heat radiation eliminating portion 15', and thus the likelihood of occurrence of a crack in the weld is reduced. However, the weld in the prismatic sealed battery does not have much higher strength than that in a prismatic sealed battery in which the edge of the prismatic outer can 15 is not cut off.

In order to find out causes of the weld not having a sufficient strength even when the edge of the prismatic outer can 15 is cut off as mentioned above, the inventor carried out a variety of experiments. Based on experiment results as well as the following facts:

(1) Generally, the sealing plate has a larger thickness than the fitting portion of the outer can; and
(2) The sealing plate is made of a material which is softer than the outer can and has excellent heat conductivity is used so as to facilitate treatment of a gas discharge valve or a negative terminal, it was found out that the sealing plate side more likely causes heat to escape therefrom and thus is less likely to be melted than the outer can side, and thus when there is a difference in degree of melting relative to the joint between the sealing plate side and the outer can side, no sufficient melting depth or sufficient joint strength is obtained.

SUMMARY OF THE INVENTION

The inventor has found out that in view of the abovementioned problems, it is preferable to reduce the heat escaping toward the sealing plate side, in other words, the abovementioned problem can be solved by providing a groove of a predetermined size at a joint of the sealing plate with the outer can, melting the joint including the groove by high-energy rays such as a laser beam to weld together the sealing plate and the outer can. In view of the foregoing, the object of the present invention is to provide a method for manufacturing a sealed battery in which a weld formed by welding a sealing plate fitted into an opening of an outer can of a battery with a laser or other high energy rays has a large breaking strength, and a sealed battery manufactured thereby.

Disclosed in JP-9-92248-A (claims, paragraphs [0042] to [0062], FIGS. 1 and 6) is a method for manufacturing a sealed battery by providing a groove of a predetermined size at a joint of a sealing plate with an outer can and then laser welding the joint between the sealing plate and the outer can above the groove while leaving the groove. However, the invention as disclosed in JP-9-92248-A is made such that when the internal pressure in the sealed battery is raised, the weld is broken beginning with the groove, that is, the groove serves as a cleavage valve, whereby the invention as disclosed in JP-9-92248-A is quite different from the present invention in terms of problems to be solved as well as features.

A method for manufacturing a sealed battery according to claim 1 of the present invention includes a first step of using an outer can having a portion defining an opening, and a sealing plate having a portion defining a groove formed around or on a part of a fitting face of the sealing plate with the outer can, and inserting the sealing plate into the opening of the outer can so that a top face of the outer can is approximately flush with a top face of a flange of the sealing plate, and a second step of welding together the outer can and the sealing plate by radiating a high energy ray to a fitting portion between the opening of the outer can and the sealing plate.

According to claim 2, in the method for manufacturing a sealed battery according to claim 1, the first step further includes inserting an electrode previously connected to the sealing plate into the outer can together with the sealing plate.

According to claim 3, in the method for manufacturing a sealed battery according to claim 1, the groove is provided to have a distance H from the top face of the flange of the sealing plate of 0.10 to 0.20 mm, a width W of 0.10 to 0.20 mm, a depth D of 0.10 to 0.15 mm, and a rise angle θ toward the top face of 0° to 60°.

According to claim 4, in the method for manufacturing a sealed battery according to claim 1, the high energy ray includes one of a laser beam and an electron beam.

According to claim 5, a sealed battery includes an outer can having a portion defining an opening, a sealing plate fitted into the opening of the outer can, and a melted and solidified portion formed by radiating a high energy ray to or around a fitting face of the sealing plate with the outer can so that the sealing plate and the outer can are welded together. A longitudinal section of the melted and solidified portion where an outer surface of the outer can is placed closest to the sealing plate has a mountain-like shape rising from a deepmost part of the melted and solidified portion outwardly of the outer can. The deepmost part of the melted and solidified portion exists in a fitting position between the outer can and the sealing plate or on the sealing plate side rather than on the outer can side.

According to claim 6, in the sealed battery according to claim 5, an inflection point exists on a boundary in the longitudinal section between the melted and solidified portion on the sealing plate side and a non-melted portion.

By using the abovementioned manufacturing method, the present invention has advantages as follows. Specifically, according to claim 1, by providing the groove in the sealing plate, a geometrically discontinuous portion is generated in the sealing plate. This reduces heat escaping toward the sealing plate when a high energy ray is radiated between the outer can and the sealing plate. Consequently, it is made possible to increase melting on the sealing plate side, to make both a melted portion on the sealing plate side and a melted portion on the outer can side have a sufficient melting depth, and thus to manufacture a sealed battery that has a sufficient joint strength. Further, according to claim 1, the groove provided in the sealing plate is filled with the melted metal. Consequently, residual stress is reduced, and strong bonding is made between the sealing plate, the melted metal, and the outer can. This makes it possible to manufacture a sealed battery whose weld has an improved strength.

According to claim 2, the electrode to be inserted into the outer can is previously connected to the sealing plate. This eliminates the need to electrically connect the electrode to the outer can after welding the sealing plate to the outer can, thereby facilitating manufacture of a sealed battery.

According to claim 3, the advantage of the invention according to claim 1 is more remarkably exhibited. In this case, if the distance H of the groove from the top face is less than 0.10 mm, the groove is instantly filled. This prevents the groove from eliminating a heat radiating portion, which would prevent the melted metal from exhibiting a great bonding strength between the outer can and the sealing plate. Alternatively, if the distance H is more than 0.20 mm, heat generated by the high energy ray is not conducted to a lower portion of the groove, which would unfavorably prevent the melted metal from exhibiting a great bonding strength between the outer can and the sealing plate.

Further, if the width W of the groove is less than 0.10 mm, the melted metal does not exhibit a great bonding strength between the outer can and the sealing plate. Alternatively, if the width W is more than 0.20 mm, the groove is not filled. This is because a spot diameter of the high energy ray, which is approximately as small as 0.6 mm on a face of the sealing plate to which the ray is radiated, becomes even smaller. This is also because the wall thickness of the outer can is typically as small as 0.20 to 0.30 mm. Therefore, the advantage of increasing the bonding strength is unfavorably reduced.

Further, if the depth D of the groove is less than 0.10 mm, the groove does not eliminate a heat radiating portion, which would prevent the melted metal from exhibiting a great bonding strength between the outer can and the sealing plate. Alternatively, if the depth D is more than 0.15 mm, heat generated by the high energy ray is not conducted to the interior of the groove. This prevents the melted metal from reaching the deepest part of the groove, which would unfavorably reduce the effect of increasing the bonding strength.

Further, even if the rise angle $\theta$ of the groove toward the top face is 0° (horizontal state), the intended advantage can be achieved. However, when the rise angle $\theta$ comes close to parallel to a distribution direction of heat generated by the high energy ray, the effect of eliminating a heat radiation portion is demonstrated to a larger degree. The optimum value of the rise angle $\theta$ varies with the material of the sealing plate, the width of the sealing plate flange, the wall thickness of the outer can, the output of the high energy ray, and the like. When the rise angle $\theta$ is 0° to 60°, a preferable result can be obtained. Alternatively, when the rise angle $\theta$ is more than 60°, the melted metal does not go into the groove, which would unfavorably reduce the effect of increasing the bonding strength.

In the invention according to claim 4, a laser beam or an electron beam, both of which are typically used as a high energy ray for use in welding, is used. This makes it possible to obtain a prismatic sealed battery that has a weld of excellent reliability and quality.

According to claims 5 and 6, a sealed battery having strong bonding between the sealing plate the melted metal, and the outer can and the weld with an improved strength can be obtained. The method for manufacturing a sealed battery according to any one of claims 1 to 4 provides a sealed battery configured according to claims 5 and 6.

BRIEF DESCRIPTION OF THE DRAWINGS

FIG. 2A is a partially enlarged cross sectional view showing shapes of portions of the sealing plate having a groove at a rise angle $\theta$ of 0° (horizontal state) toward the top face of the sealing plate, while

FIGS. 3A to 3C show a relationship between the presence or absence of the groove and a shape of a weld.

FIGS. 4A and 4B show isothermal lines when a laser beam is radiated to a joint between an outer can and a sealing plate. FIG. 4A shows a case according to the embodiments in which a groove is provided, while

DESCRIPTION OF THE PREFERRED EMBODIMENTS

Preferred embodiments of the invention will now be described in detail using a prismatic sealed battery and a laser beam serving as a high energy ray with reference to FIGS. 1 to 3 and a variety of examples. The experimental examples described later are used to embody the technical idea of this invention, so they are not intended to limit the invention. Various modifications can be made to the invention without departing from the spirit and scope of the claims appended hereto. For example, the invention is also applicable to a case in which a circular sealed battery is used or a case in which an electron beam is used as the high energy ray.

Figures 1, 1A:
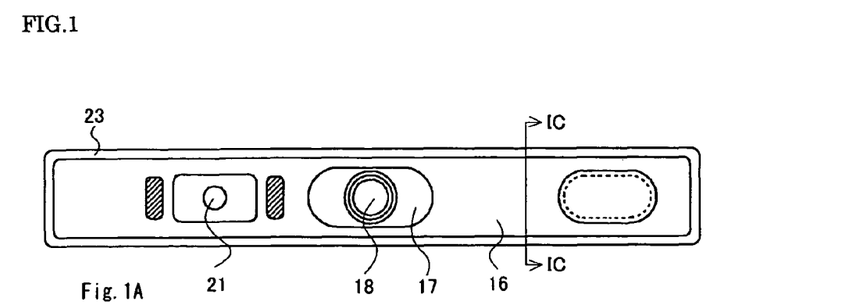
FIG. 1A is a top view of a sealing plate according to an embodiment of the present invention.
Figure 1B:
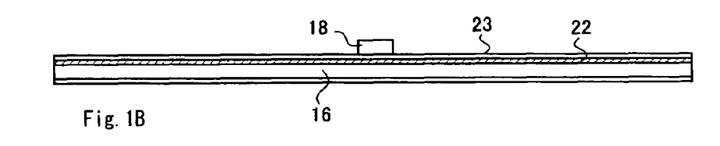
FIG. 1B is a side view of FIG. 1A.
Figure 1C:
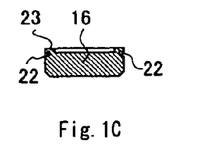
FIG. 1C is a cross sectional view taken along line IC-IC of FIG. 1A.
Figures 2, 2A:
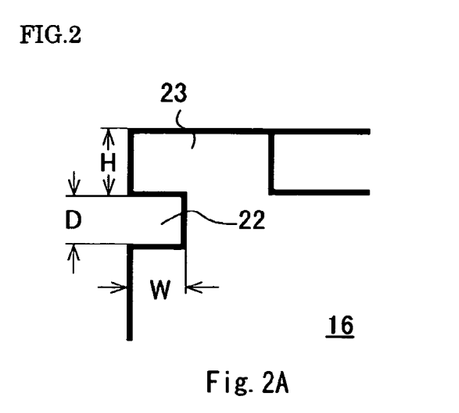
Figure 2B:
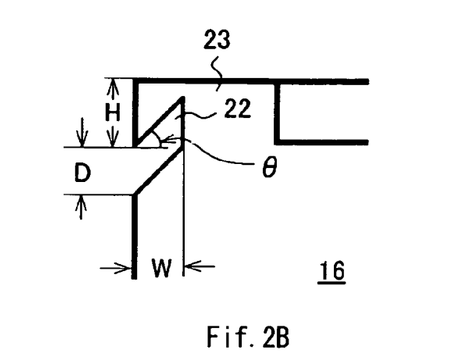
FIG. 2B is a partially enlarged cross sectional view showing shapes of portions of the sealing plate when the rise angle $\theta$ is more than 0°.

FIG. 1A is a top view of a sealing plate according to an embodiment of the invention, FIG. 1B is a side view of FIG. 1A, and FIG. 1C is a cross sectional view taken along line IC-IC of FIG. 1A. FIG. 2A is a partially enlarged cross sectional view showing shapes of portions of the sealing plate having a groove at a rise angle $\theta$ of 0° (horizontal state) toward the top face of the sealing plate, and FIG. 2B is a partially enlarged cross sectional view showing shapes of portions of the sealing plate when the rise angle $\theta$ is more than 0°. FIGS. 3A to 3C show relationships between the presence or absence of the groove and a shape of a weld. FIG. 3A represents a case according to an embodiment in which the rise angle $\theta$ is 0° (horizontal state). FIG. 3B represents a case according to another embodiment in which the rise angle $\theta$ is more than 0°. FIG. 3C represents a case according to a related-art example in which no groove is provided. FIGS. 4A and 4B show isothermal lines when a laser beam is radiated to a joint between an outer can and a sealing plate. FIG. 4A represents a case according to embodiments in which a groove is provided. FIG. 4B represents a case according to a related-art example in which no groove is provided. Elements of a prismatic sealed battery shown in these figures are given the same reference numerals as those of the related-art prismatic sealed battery shown in FIG. 5.

Experimental Example

To begin with, an experimental method that is common to the embodiments and comparative examples is described. As a sealing plate 16 included in a prismatic sealed battery according to first to fourth embodiments, an approximately prismatic sealing plate 16 made of pure aluminum is used as shown in FIGS. 1A to 1C. The sealing plate 16 has a flange 23 on a periphery thereof, a negative terminal 18 mounted at a central part thereof with an insulator 17 therebetween, an electrolyte injection hole 21, and a groove 22 which is formed by cutting a side face of the sealing plate around its perimeter. The first, second, and fourth embodiments use the groove 22 at a rise angle θ of 0° toward the top face of the flange 23 (see FIG. 2A), while the third embodiment uses the groove 22 at a rise angle θ of 45° (see FIG. 2B). Outer dimensions of the sealing plate and dimensions of the groove vary depending on the embodiment. An experiment was performed on each embodiment. As sealing plates of first to third comparative examples, plates that have the same material and dimensions as those of the corresponding embodiments were used with the exception that no groove was provided in the sealing plates of the first to third comparative examples.

Figures 3, 3A:
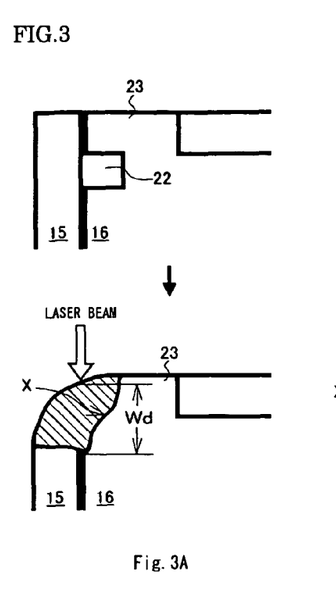
FIG. 3A shows a case according to one embodiment in which the rise angle $\theta$ is 0° (horizontal state)
Figure 3B:
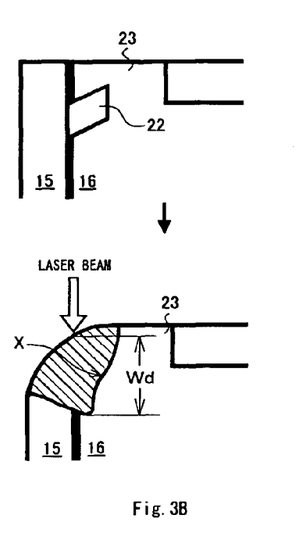
FIG. 3B shows a case according to another embodiment in which the rise angle $\theta$ is more than 0°.
Figure 3C:
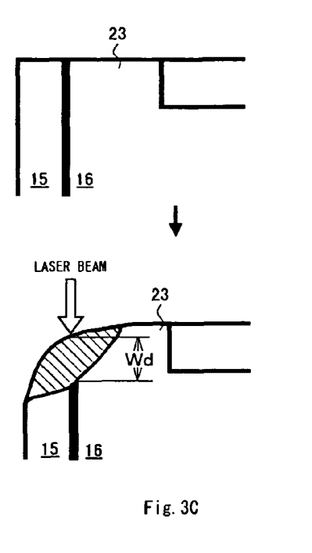
FIG. 3C shows a related-art example in which no groove is provided.
Figures 4, 4A:
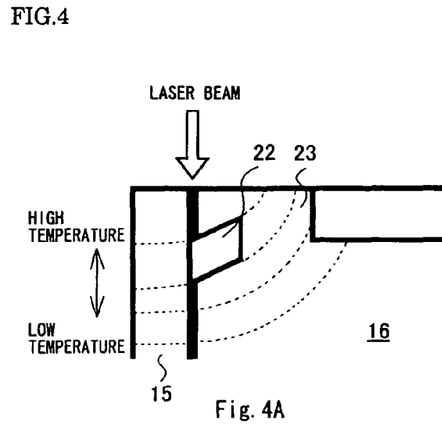
Figure 4B:
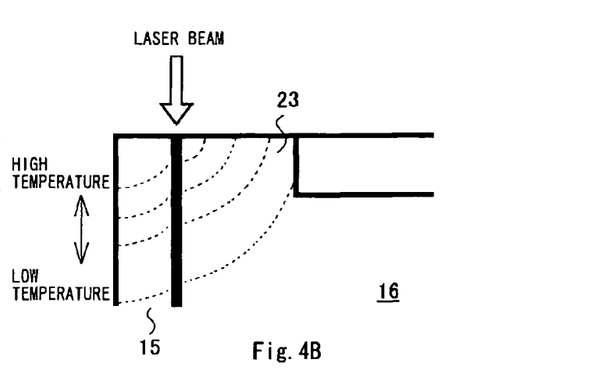
FIG. 4B shows a related-art example in which no groove is provided.

Each of the sealing plates 16 used in the first to fourth embodiments and the first to third comparative examples was previously mounted at an inner edge of an outer can 15 of predetermined dimensions with a wall thickness of 0.20 mm, as shown in the upper portions of FIGS. 3A to 3C to manufacture a dummy battery in which no electrode or electrolyte is used. Fifteen of such dummy batteries were thus manufactured. Subsequently, the sealing plate 16 and the outer can 15 were welded by radiating a laser beam to a joint therebetween along the whole circumference from the top face side of the flange 23. Then, ten of the fifteen dummy batteries were cut vertically at a side of the negative terminal 18. A welding depth Wd was measured at the cross section of the melted and solidified part thus obtained.

In this cross section, a distance of the melted and solidified portion from an outer face of the outer can 15 to the sealing plate 16 is shortest. As indicated by oblique lines in the lower portions of FIGS. 3A and 3C, the cross sections of the melted and solidified portions had different shapes which are each mountain-like and rising outwardly of the outer can 15. In the first to fourth embodiments with the groove provided, the deepest part of the melted and solidified portion was in a fitting position between the outer can 15 and the sealing plate 16 or on the side of the sealing plate 16, as shown in the lower portions of FIGS. 3A and 3B. When the rise angle θ is 0°, the deepest part of the melted and solidified portion was positioned at the same depth from the fitting position between the outer can 15 and the sealing plate 16 to the outer face of the outer can 15 in some cases. On the other hand, in the first to third comparative examples with no groove provided, the cross section of the melted and solidified portion was deepest on the outer edge side of the outer can 15, as shown in the lower part of FIG. 3C.

As shown in FIGS. 3a to 3C, the welding depth Wd represents the distance from the top part to the deepest part of the fitting portion in the melted and solidified portion. As for the remaining five dummy batteries, the negative terminal 18 was pressured with a round bar with a tip diameter φ of 3 mm. The load at the time of breakage of the laser weld or sealing plate was measured, and thus the press strength was measured. As for the third and fourth embodiments and the third comparative example, the displacement at the time of measuring the press strength was also measured. Table 1 shows experiment results along with the outer dimensions, the groove dimensions, and the groove rise angle θ toward the top face, of each sealing plate.

TABLE 1

| | Sealing Plate Outer Dimensions (mm) | | | Groove Dimensions | | | | Welding Depth | Press Strength | Displacement at |
|---|---|---|---|---|---|---|---|---|---|---|
| | Shorter Edge | Longer Edge | Height | H | D | W | θ | Wd (mm) | (N) | Breakage (mm) |
| Embodiment 1 | 3.7 | 33.3 | 1.0 | 0.15 | 0.15 | 0.15 | 0° | 0.24(0.23~0.27) | 314(309~322) | |
| Comparative Example 1 | " | " | " | — | — | — | — | 0.19(0.18~0.21) | 270(253~285) | |
| Embodiment 2 | 4.7 | 33.3 | 1.0 | 0.15 | 0.15 | 0.15 | 0° | 0.22(0.19~0.25) | 347(329~361) | |
| Comparative Example 2 | " | " | " | — | — | — | — | 0.18(0.17~0.20) | 302(290~311) | |
| Embodiment 3 | 6.0 | 33.7 | 1.1 | 0.10 | 0.15 | 0.15 | 45° | 0.24(0.20~0.28) | 382(355~417) | 4.23(3.80~4.85) |
| Embodiment 4 | " | " | " | " | " | " | 0° | 0.22(0.20~0.24) | 368(352~396) | 3.98(3.75~4.32) |
| Comparative Example 3 | " | " | " | — | — | — | — | 0.15(0.14~0.16) | 339(329~357) | 3.15(2.70~3.68) |

(The measured values represent average values. The numeric values in parentheses represent maximum and minimum values.)

Comparisons were made between the experiment results of the first embodiment and those of the first comparative example, both of which had the same dimensions of the sealing plate. Comparisons were also made between the experiment results of the second embodiment with those of the second comparative example, both of which had the same dimensions of the sealing plate. Consequently, it was confirmed that the welding depth Wd and the press strength of the first and second embodiments were larger than those of the first and second comparative examples, respectively, and thus the welding strength of the first and second embodiments was larger than that of the first and second comparative examples, respectively. Similarly, comparisons were made between the third and fourth embodiments and the third comparative example, all of which had the same dimensions of the sealing plate. Consequently, it was confirmed that the welding depth Wd, the press strength, and the displacement amount at breakage of the third and fourth embodiments were larger than those of the third comparative examples. In the third comparative example, breakage occurred at the midpoint of the melted and solidified portion (on the boundary between the outer can 15 and the sealing plate 16). In the third and fourth embodiments, the melted and solidified portion was so strong that it became deformed with the outer can 15 and the sealing plate 16 remaining bonded to each other. Finally, breakage occurred on the boundary between the sealing plate 16 and the melted and solidified portion. Further, comparisons were made between the third embodiment, in which the groove was inclined at a rise angel θ of 45°, and the fourth embodiment, in which a rise angle θ of the groove was 0°. The welding depth Wd, the press strength, and the displacement amount at breakage, of the third embodiment were larger than those of the fourth embodiment.

Therefore, the welding depth Wd and the press strength with a groove provided around the perimeter of the sealing plate become larger than those with no groove provided, regardless of the dimensions of the sealing plate, thereby increasing the strength of the weld. Further, the groove inclined at a rise angel θ (θ>0°) enhances the strength of the weld than the groove with no incline (θ=0°).

The reason for this phenomenon is presumably attributed to the following factors. When the joint between the outer can 15 and the sealing plate 16 is laser welded, heat generated by irradiation of the laser beam is conducted in a direction perpendicular to the isothermal lines indicated by the dotted lines in FIGS. 4A and 4B. At this point, if no groove is present around the perimeter of the sealing plate 16, the side of the sealing plate 16 having higher heat conductivity more likely causes heat to escape and is less likely melted than the side of the outer can 15. Consequently, the melting degree of the side of the sealing plate 16 relative to the joint differs from that of the side of the outer can 15 relative to the joint. This prevents the fitting portion from having a sufficient melting depth and thus reduces the welding strength.

When the groove 22 is provided around the perimeter of the sealing plate 16, the heat radiation eliminating function of the groove reduces heat escaping toward the sealing plate side and thus increases melting of the sealing plate side. Consequently, the melting degree of the side of the sealing plate 16 relative to the joint becomes almost identical to that of the side of the outer can 15, thereby increasing the welding strength. Since the groove 22 is filled with the melted metal as shown in FIGS. 3A and 3B, an inflection point X is formed in the cross section of the melted and solidified portion on the side of the sealing plate 16. Accordingly, the deepest part of the melted and solidified portion appears on the sealing plate 16 side. Therefore, the presence or absence of the inflection point X and the position of the deepest part of the melted and solidified portion determine whether or not the groove 22 has been provided around the perimeter of the sealing plate 16 before welding.

As for the position and size of the groove 22 provided around the perimeter of the sealing plate 16, if the distance H from the top face of the sealing plate of the groove is less than 0.10 mm on one hand, the groove is instantly filled with the melted metal. This prevents the groove from eliminating a heat radiating portion and thus prevents the melted metal from exhibiting great bonding strength between the outer can and the sealing plate. If the distance H is more than 0.20 mm on the other hand, heat generated by irradiation of the high energy ray is not conducted to a lower portion of the groove, which would unfavorably prevent the melted metal from exhibiting great bonding strength between the outer can and the sealing plate. Therefore, the distance H is preferably 0.10 to 0.20 mm.

If the width W of the groove is less than 0.10 mm on one hand, the melted metal does not exhibit great bonding strength between the outer can and the sealing plate. If the width W is more than 0.20 mm on the other hand, the groove is not fully filled, thereby reducing the effect of the increasing boding strength. This is because the spot diameter of the high energy ray, which is approximately as small as 0.6 mm on the irradiated face of the sealing plate, becomes even smaller in the groove. This is also because the wall thickness of the outer can is typically as small as 0.20 to 0.30 mm. Therefore, the width W is preferably 0.10 mm to 0.20 mm.

If the depth D of the groove is less than 0.10 mm on one hand, the groove does not eliminate a heat radiating portion, thereby preventing the melted metal from exhibiting great bonding strength between the outer can and the sealing plate. If the depth D is more than 0.15 mm on the other hand, heat generated by irradiation of the high energy ray is not conducted to the interior of the groove. This prevents the melted metal from reaching the deepest part of the groove, which would unfavorably reduce the effect of the increasing bonding strength. Therefore, the depth D is preferably 0.10 to 0.15 mm.

Even if the rise angle θ of the groove toward the top face of the sealing plate is 0° (horizontal state), the intended advantage can be achieved. However, when the rise angle θ comes close to parallel to a distribution direction of heat generated by irradiation of the high energy ray, the effect of eliminating a heat radiating portion is demonstrated to a larger degree. Alternatively, when the rise angle θ is more than 60°, the melted metal does not go into the groove, which would unfavorably reduce the effect of increasing the bonding strength. Therefore, the rise angle θ is preferably 0° to 60°.

In the abovementioned embodiments, laser welding is used as a welding method. The invention is not limited to such embodiments. Welding can be carried out using a known high energy ray, such as an electron beam. In the abovementioned embodiments, a groove is provided around the perimeter of the sealing plate, but grooves may be provided at intervals.

The invention claimed is:

1. A method for manufacturing a sealed battery, comprising:
    (1) using an outer can having a portion defining an opening, and a sealing plate having a portion defining a groove formed around or on a part of a fitting face of said sealing plate with said outer can, and inserting said sealing plate into said opening of said outer can so that a top face of said outer can is flush with a top face of a flange of said sealing plate being on an upper side of the groove; and
    (2) welding together said outer can and said sealing plate by applying a high energy ray to a fitting portion between said opening of said outer can and said top face of said flange of said sealing plate, wherein molten metal generated from said welding is deposited in said groove;
    wherein said groove is formed on a lower side of said top face of said flange of said sealing plate and said upper side of said groove is covered by said top face of said flange, and
    wherein the minimum distance from the top face of said flange of said sealing plate to the top of said groove being on a lower side of said flange is at least 0.1 mm.

2. The method for manufacturing a sealed battery according to claim 1, wherein said sealing plate comprises an electrode connected thereto such that said electrode is inserted into said outer can together with said sealing plate during said first step.

3. The method for manufacturing a sealed battery according to claim 1, wherein said groove is provided to have a distance H from said top face of said flange of said sealing plate of 0.10 to 0.20 mm, a width W of 0.10 to 0.20 mm, a depth D of 0.10 to 0.15 mm, and a rise angle θ toward said top face of 0° to 60°.

4. The method for manufacturing a sealed battery according to claim 1, wherein said high energy ray includes one of a laser beam and an electron beam.

5. A sealed battery formed by following the method steps of claim 1, comprising:
    an outer can including a portion defining an opening;
    a sealing plate fitted into said opening of said outer can; and
    a melted and solidified portion formed by radiating a high energy ray to or around a fitting face of said sealing plate with said outer can so that said sealing plate and said outer can are welded together;
    a longitudinal section of said melted and solidified portion where an outer surface of said outer can is placed closest to said sealing plate having a mountain-like shape rising from a deepmost part of said melted and solidified portion outwardly of said outer can, and said deepmost part of said melted and solidified portion existing in a fitting position between said outer can and said sealing plate or on said sealing plate side rather than on said outer can side.

6. The sealed battery according to claim 5, wherein an inflection point exists on a boundary in said longitudinal section between said melted and solidified portion on said sealing plate side and a non-melted portion.

7. A method for manufacturing a sealed battery, comprising:

using an outer can having a portion defining an opening, and a sealing plate having a fitting face adapted to fit with said outer can and a portion defining a groove formed around or on a part of said fitting face of said sealing plate with said outer can, and inserting said sealing plate into said opening of said outer can so that a top face of said outer can is approximately flush with a top face of a flange of said sealing plate being on an upper side of the groove; and then welding together said outer can and said sealing plate by applying a high energy ray to a fitting portion between said opening of said outer can and said top face of said flange of said sealing plate, wherein molten metal generated from said welding is deposited in said groove;

wherein said groove is formed on a lower side of said top face of said flange of said sealing plate and said upper side of said groove is covered by said top face of said flange, and wherein the minimum distance from the top face of said flange of said sealing plate to the top of said groove being on a lower side of said flange is at least 0.1 mm.

8. The method for manufacturing a sealed battery according to claim 7, wherein said sealing plate comprises an electrode connected thereto such that said electrode is inserted into said outer can together with said sealing plate during said first step.

9. The method for manufacturing a sealed battery according to claim 7, wherein said groove is provided to have a distance H from said top face of said flange of said sealing plate of 0.10 to 0.20 mm, a width W of 0.10 to 0.20 mm, a depth D of 0.10 to 0.15 mm, and a rise angle $\theta$ toward said top face of 0° to 60°.

10. The method for manufacturing a sealed battery according to claim 7, wherein said high energy ray includes one of a laser beam and an electron beam.

* * * * *